United States Patent [19]
Bloomfield

[11] Patent Number: 6,141,008
[45] Date of Patent: Oct. 31, 2000

[54] METHOD AND SYSTEM FOR PROVIDING SIZE ADJUSTMENT FOR A MAXIMIZED WINDOW IN A COMPUTER SYSTEM GRAPHICAL USER INTERFACE

[75] Inventor: Marc Alan Bloomfield, Lighthouse Point, Fla.

[73] Assignee: International Business Machines Corporation, Armonk, N.Y.

[21] Appl. No.: 07/854,257

[22] Filed: Mar. 20, 1992

[51] Int. Cl.[7] .................................................. G06F 3/100
[52] U.S. Cl. .......................................... 345/340; 345/342
[58] Field of Search .................................... 395/155, 157, 395/158, 161; 345/326, 333, 334, 339, 340, 341, 342, 343, 344, 345

[56] References Cited

U.S. PATENT DOCUMENTS

| | | | |
|---|---|---|---|
| 5,208,906 | 5/1993 | Morgan | 395/157 X |
| 5,227,771 | 7/1993 | Kerr et al. | 395/157 X |

OTHER PUBLICATIONS

Microsoft User's Guide (Trademark of Microsoft Corporation) 1990, attached sheets 1–3.
Microsoft Windows User's Guide (Trademark of Microsoft Corporation), 1990, pp. 9.24×43.
IBM Corporation, "Getting Started, IBM Operating System/2 Standard Edition," Version 1.2, Sep. 1989, pp. 21–27, 71–73 and 90–91.
WordPerfect Corporation, "WordPerfect for IBM Personal Computer," Version 5.0, 1989, pp. 372–377.

Primary Examiner—Mark K. Zimmerman
Assistant Examiner—Cliff N. Vo
Attorney, Agent, or Firm—Bruce D. Jobse; Felsman, Bradley, Vaden, Gunter & Dillon, LLP

[57] ABSTRACT

The present invention is directed to an improved mobile data processing device and a method of operating a mobile data processing device. The mobile data processing device includes a relatively small display screen. The present invention utilization by the mobile data processing device of an application which includes a plurality of screens which have been written for use in a data processing system having a relatively large display screen. When the application is loaded into the mobile data processing device and started, at least a portion of a particular one of the plurality of screens of the application is displayed on the relatively small display screen of the mobile data processing device. Next, the mobile data processing device is utilized to determine whether or not display items from said particular one of said plurality of screens are not fully displayed within said relatively small display screen of said mobile data processing device. If it is determined that said display items from said particular one of said plurality of screens are not fully displayed within said relatively small display screen of said mobile data processing device, then said mobile data processing device automatically generates a substitute screen for said particular one of said plurality of screens in said application. The substitute screen relocates said display items to render them visible on said relatively small display screen of said mobile data processing device.

10 Claims, 9 Drawing Sheets

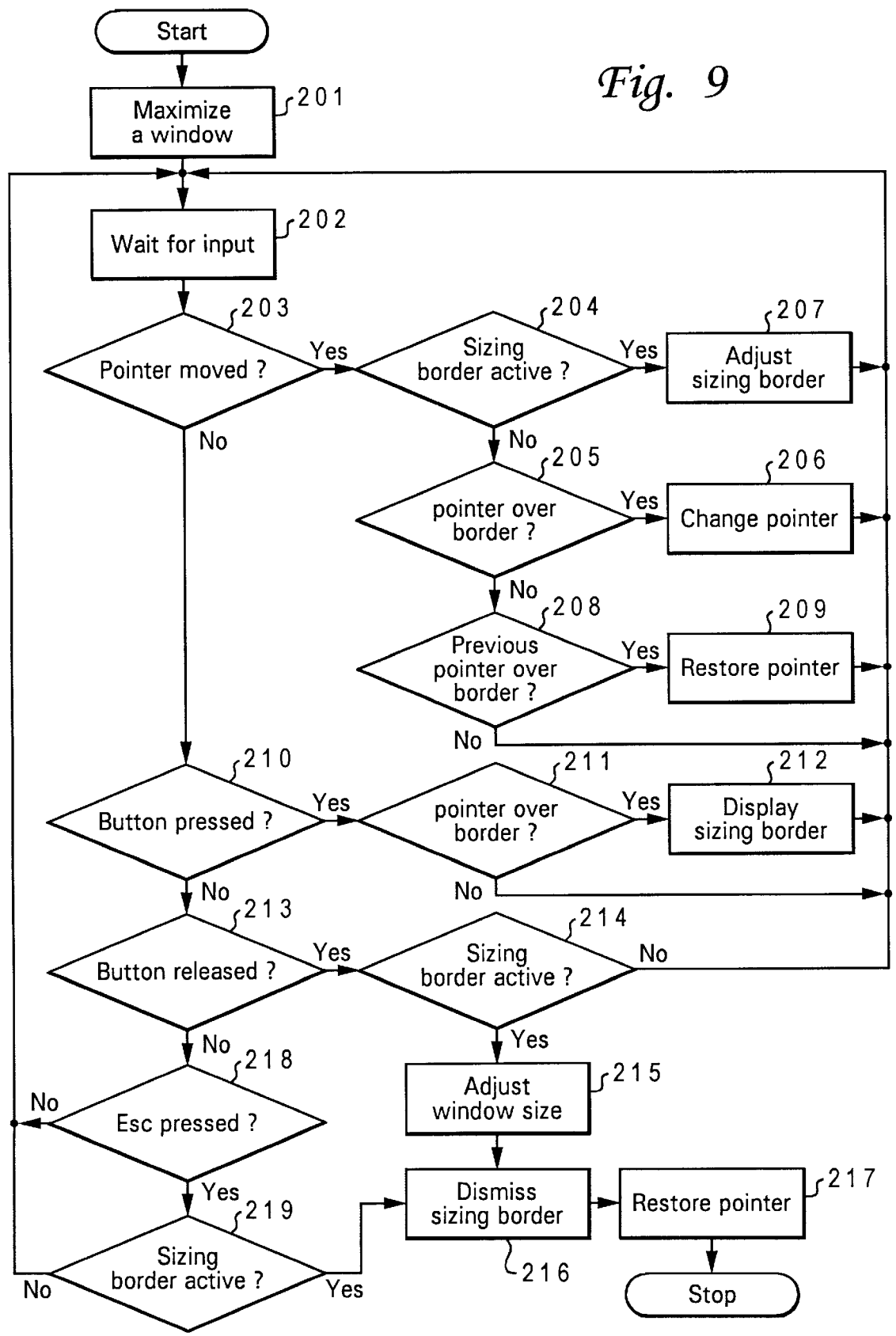

METHOD AND SYSTEM FOR PROVIDING SIZE ADJUSTMENT FOR A MAXIMIZED WINDOW IN A COMPUTER SYSTEM GRAPHICAL USER INTERFACE

CROSS-REFERENCE TO RELATED APPLICATIONS

The present patent application is one of a group of copending applications which concern the same overall personal computer system but which individually claim different inventive concepts embodied in such personal computer system. These related patent applications were filed on the same date, namely Mar. 20, 1992, are specifically incorporated by reference herein, and are more particularly described as follows:

(1) application Ser. No. 07/854,171, filed Mar. 20, 1992 entitled "Method for Providing Conditional Cascading in a Computer System", having Attorney Docket Number of BC9-92-046, the inventors being Bloomfield et al;

(2) application Ser. No. 07/855,366, filed Mar. 20, 1992 entitled "Method for Providing a Readily Distinguishable Template and Means of Duplication Thereof in a Computer System Graphical User Interface", having Attorney's Docket Number of BC9-92-047, the inventors being Bloomfield et al.

(3) application Ser. No. 07/855,369, filed Mar. 21, 1992 entitled "Palette Manager In A Graphical User Interface Computer System" having Attorney's Docket Number of BC9-92-044, the inventors being Bloomfield et al.

FIELD OF THE INVENTION

This invention relates to personal computer systems and in particular to a method and device for improving a graphical user interface (GUI) on a personal computer system.

BACKGROUND DISCUSSION

Personal computer systems in general and IBM personal computers in particular have attained widespread use for providing computer power to many segments of today's modern society. Personal computer systems can usually be defined as a desktop, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

Examples of such personal computer systems are IBM's PERSONAL COMPUTER AT, IBM's PERSONAL SYSTEM/2 Models 25, 30, 35, 40 SX, 55 SX, 57 SX, 70, 80, 90 and 95, and IBM PERSONAL SYSTEM/1 computers. These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 55 SX through 95. Beginning with the earliest personal computer system of the Family I models, such as the IBM Personal Computer, it was recognized that the operating system would be of utmost importance. Realizing that market acceptance was a primary goal, IBM chose a rather simple text oriented operating system which was suited for the level of hardware technology of the time. The operating system chosen was named DOS which is the acronym for disk operating system. The limited objectives for DOS at the time were non-cryptic commands, English language error messages (instead of error codes, small memory size (12 Kbyte) and reasonable performance. DOS served well for the Family I machines and even into the basic Family II models, but as memory and hardware prices declined and performance increased a more user friendly intuitive operating system was needed. Beginning in 1986, IBM started development of a graphical user interface (GUI) designed to mask the complexity of the hardware technology advances and present to the user an intuitive, flexible, and easy-to-use system. This operating system was named OS/2 and was developed for the more advanced technology of the Family II models.

Additionally, other manufactures have investigated and used other types of GUI systems. One of the earliest in the personal computing area was Xerox's STAR system that presented the user with icons representing a particular operation or software application. Later, APPLE's Macintosh system added features such as windows and drag and drop to further the intuitive nature of the graphical user interface for APPLE's line of computers. Presently, MICROSOFT's WINDOWS provides a graphical user interface on IBM compatible machines.

With GUI systems, the computer system is controlled using a pointing device such as a mouse. The pointing device controls the location of a pointer that appears on the screen of the computer's display device. Elements on the screen such as icons, which are graphical representations of various modules such as disk drives, applications and documents, or windows, which are rectangular areas on the screen in which applications or documents can be viewed, may be manipulated using the mouse. In this way, the underlying devices which the elements represent may be controlled.

As GUI systems developed, producing the underlying elements such as windows and icons has become well known. In fact, publicly available tools such as icon and window editors are now available to actually create the visual display. For example, Conklin, OS/2 Notebook, (Microsoft Press, 1990) pp. 159–255 discusses OS/2 software tools.

As new models of the personal computer family were introduced, OS/2 had to be updated and enhanced. One of the major features of the OS/2 Version 2.0 operating system in which the present invention is incorporated is a workplace shell featuring a desktop metaphor. Briefly, the desktop metaphor presents the user with the look of a desktop. For example, files can appear as icons grouped together into folders. Folders can be placed into a predefined space such as a window. Application programs appear as unique icons that can be activated when a pointer, positioned by the movement of a mouse over the icon, is energized usually by double clicking one of the mouse buttons.

Prior GUI systems such as IBM OS/2 Version 1.3 and Microsoft Windows provide three states of windows, namely, the maximized, minimized and the restored states. The minimized state realizes the window as an icon. The maximized state results in the window being displayed at the largest supported size of a particular computer display or at the size of the available display area. For example, FIG. 1 shows a window 2 in the maximized state. As seen in FIG. 1, the maximized window 2 occupies substantially the entire viewing area of display screen 4.

The restored state refers to any size of the window other than the maximized and minimized states. For example, FIG. 2 depicts window 2 in a restored state wherein window 2 occupies less than the entire display screen 4.

Unfortunately, in such prior systems, when a window was in the maximized state, the only way to make a size adjustment to the maximized window was to change the window from the maximized state to the restored state. Once the window was in the restored state, the size could be adjusted by clicking on the border of the window and moving the border via mouse action to adjust the size and dimensions of the window. The requirement of entering the restored state before making any sizing adjustments to a maximized window undesirably consumes the user's valuable time which is a precious commodity in the modern computing environment.

SUMMARY OF THE INVENTION

The present invention has been developed for the purpose of solving the above mentioned problems. Accordingly, the invention has as one of its objects a means for reducing the time consumed by the user when attempting to adjust the size of a maximized window on a computer screen in a graphical user interface.

Another objective of the present invention is to enhance the ease of use of a graphical user interface.

In accordance with the present invention, a method is provided for displaying a window on a computer screen in a computer system employing a graphical user interface. The method includes the steps of displaying on the computer system a window including a periphery, a border being situated around the periphery. The method further includes the step of maximizing the window to occupy substantially the full screen. The method also includes the steps of locating the pointer on the border and activating the pointer. The method still further includes the step of moving the pointer to a desired location on the screen, the dimensional size of the window changing in correspondence to the motion of the pointer on the screen.

In accordance with another embodiment of the present invention, a method is provided for displaying a window on a computer screen employing a graphical user interface. That method includes the steps of displaying on the screen a window including a periphery, a first border being situated around the periphery. The method also includes the step of maximizing the window to occupy substantially the full screen. The method further includes the step of locating the pointer on the first border by moving the pointer with a pointing device. The method also includes the step of selecting the first border with the pointing device to create a sizing border initially superimposed on the first border. The method still further includes the step of dragging a portion of the sizing border from a first location on the screen to a second location on the screen to change the shape and size of the sizing border. The method also includes the steps of deselecting the sizing border with the pointing device and changing the size and shape of the first border to match the size and shape of the sizing border thus changing the dimensions of the window.

BRIEF DESCRIPTION OF THE DRAWINGS

The foreground aspects and other features of the present invention are explained in the following written description, taken in connection with the accompanying drawings, wherein:

FIG. 9 is a flowchart of the operation of the method of the present invention

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appending claims.

I. Operation Of The Computer System—General

Figure 1:
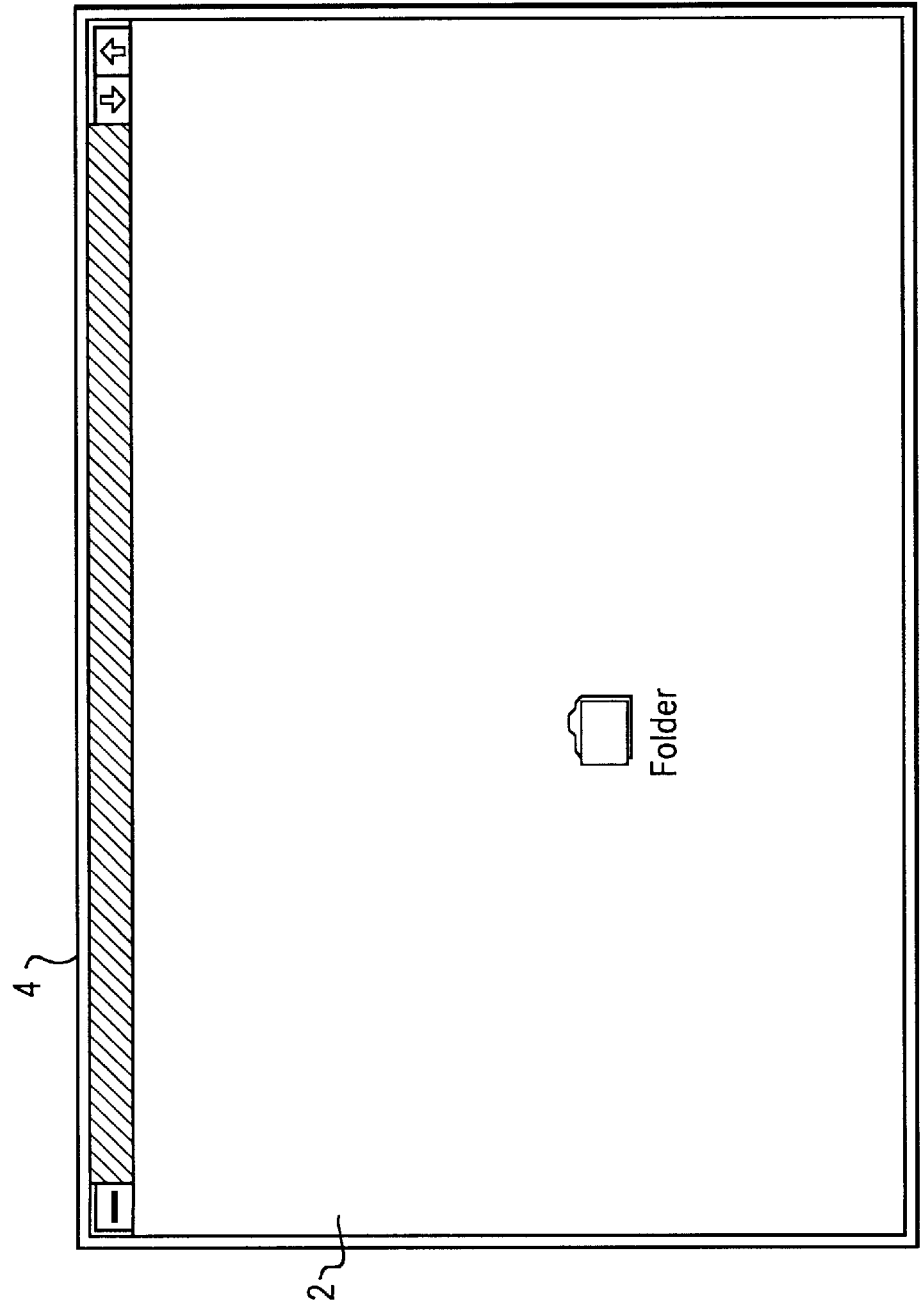
FIG. 1 is a screen representation of a maximized window employed in a graphical user interface
Figure 2:
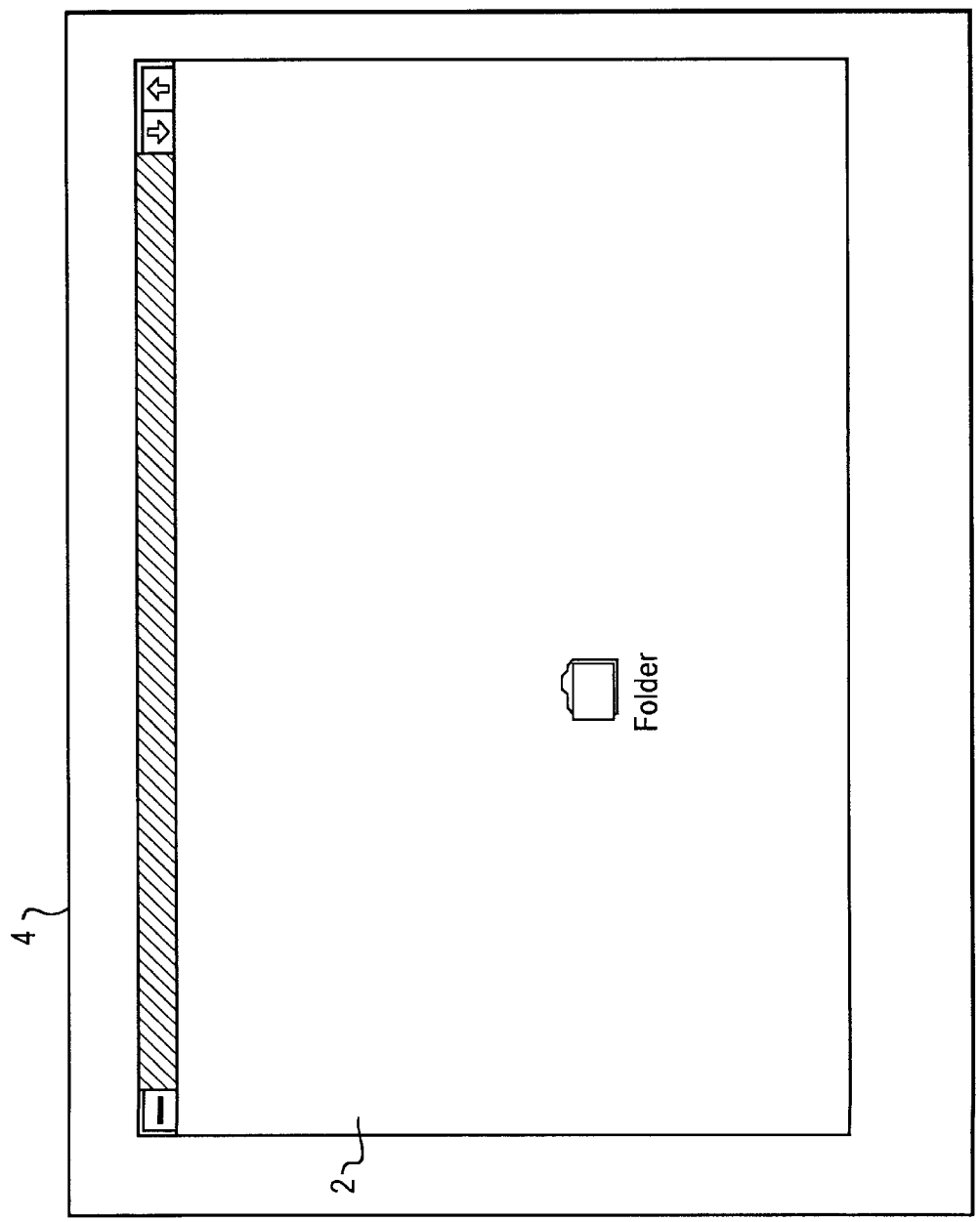
FIG. 2 is a screen representation of a restored window employed in a graphical user interface.
Figure 3:
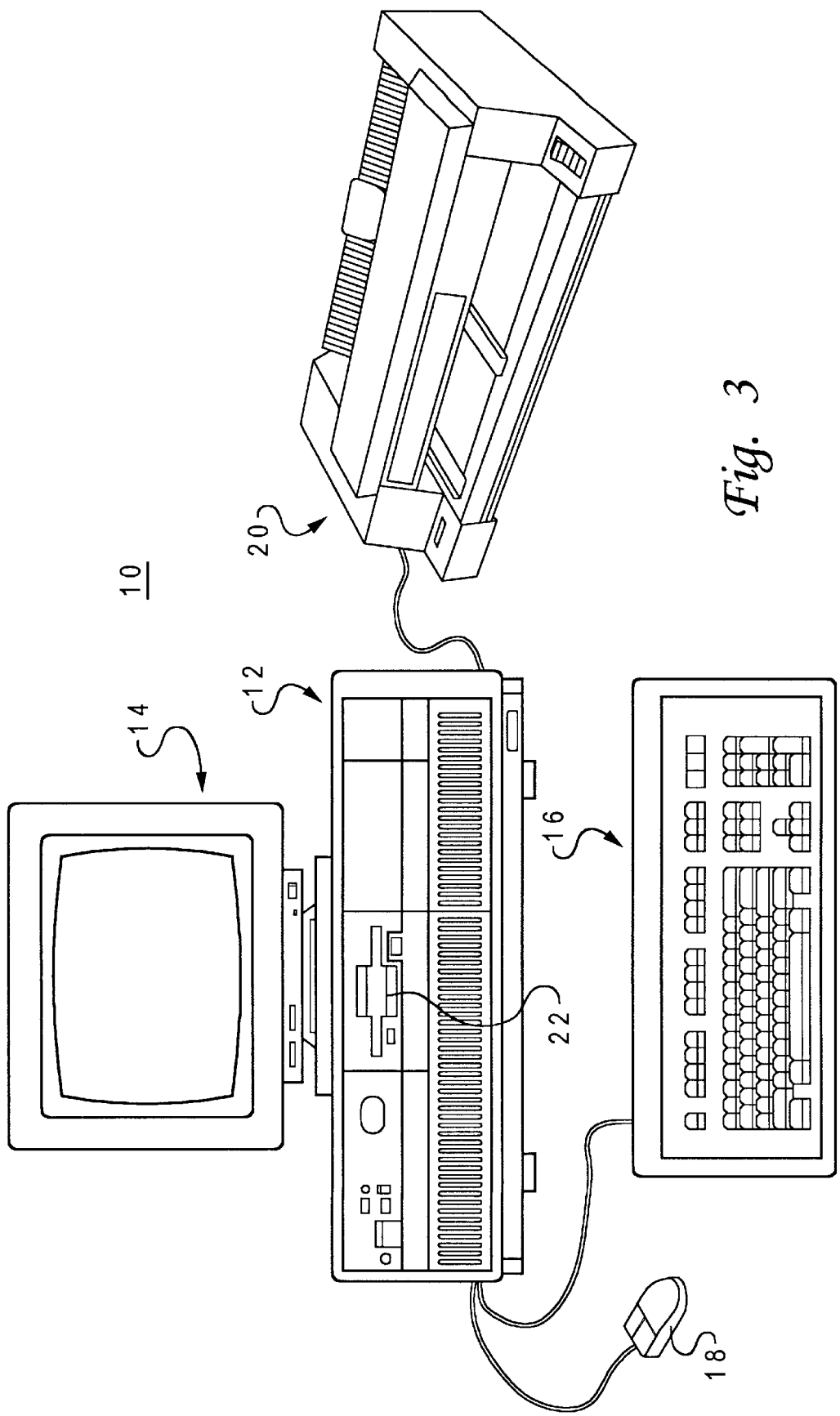
FIG. 3 shows a personal computer system in which the present invention can be employed.

Prior to relating the methodology and structure of the present invention, a summary of the operation in general of a typical personal computer system may merit review. Referring now to the drawings, and in particular to FIG. 3, there is shown a Personal Computer System 10 in which the present invention can be employed. As shown, the Personal Computer System 10 comprises a number of components which are interconnected together. More particularly, a system unit 12 is coupled to and can drive an optional monitor 14 (such as a conventional video display). A system unit 12 can also be optionally coupled to input devices such as a PC keyboard 16 or a mouse 18. Mouse 18 includes right and left buttons (not shown). The left button is generally employed as the main selector button and is alternatively referred to as the first mouse button or mouse button 1. The right button is typically employed to select auxiliary functions as explained later. The right mouse button is alternatively referred to as the second mouse button or mouse button 2. An optional output device such as a printer 20 can also be connected to the system unit 12. Finally the system unit 12 may include one or more mass storage devices such as the diskette drive 22.

As will be described below, the system unit 12 responds to input devices such as the PC keyboard 16, the mouse 18, or local area networking interfaces. Additionally, input/output devices, such as the diskette drive 22, display 14, printer 20, and local area network communication system are connected to the system unit 12 in a manner well known. Of course, those skilled in the art are aware that other conventional components can also be connected to the system unit 12 for interaction therewith. In accordance with the present invention, the computer system 10 includes a system processor that is interconnected to a random access memory (RAM), a read only memory (ROM), and a plurality of I/O devices.

In normal use, the personal computer system can be designed to give independent computing power to a small group of users as a server or a single user and is inexpensively priced for purchase by individuals or small businesses. In operation, the system processor functions under an operating system, such as IBM's OS/2 operating system or DOS. This type of operating system includes a BIOS interface between the I/O devices and the operating system. BIOS, which can be stored in a ROM on a motherboard or planar, includes diagnostic routines which are contained in a power on self test section referred to as POST.

II. Operation Of The Computer System—In More Detail

Figure 4:
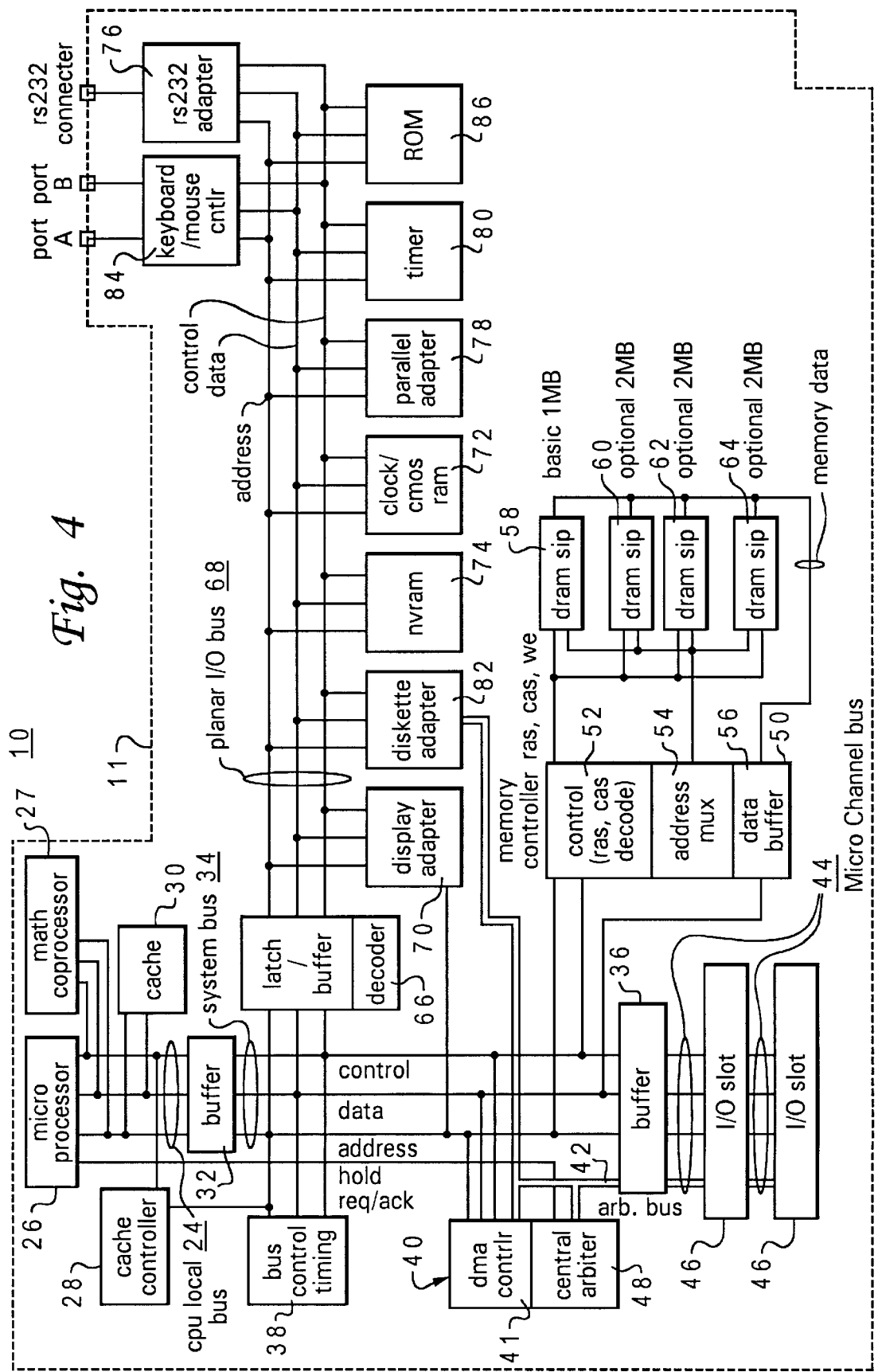
FIG. 4 shows a system block diagram for the personal computer system of FIG. 2.

Prior to relating the above structure to the present invention, a summary of the operation in general of the Personal Computer System 10 may merit review. Referring to FIG. 4, there is shown a block diagram of the Personal Computer System 10 illustrating the various components of the Computer System 10 in accordance with the present invention. FIG. 4 further illustrates components of the planar 11 and the connection of the planar 11 to the I/O slots 46 and other hardware of the Personal Computer System 10. Connected to the planar 11 is the system processor 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used, one suitable microprocessor is the 80386 which is sold by Intel.

While the present invention is described hereinafter with particular reference to the system block diagram of FIG. 4, it is to be understood at the outset of the description which follows, it is contemplated that the apparatus and methods in accordance with the present invention may be used with other hardware configurations of the planar board. For example, the system processor could be an Intel 80286 or 80486 microprocessor. These particular microprocessors can operate in a real addressing mode or a protected addressing mode. Each mode provides an addressing scheme for accessing different areas of the microprocessor's memory.

Returning now to FIG. 4, the CPU local bus 24 (comprising data, address and control components) provides for the connection of a microprocessor 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a DMA unit 40. The DMA unit 40 is comprised of a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. Also connected to system bus 34 is a memory control unit 50 which is comprised of a memory controller 52, an address multiplexer 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 4 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70 (which is used to drive an optional display 14), a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system to NVRAM which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

III. OS/2 Version 2 Operating System—General

Figure 5:
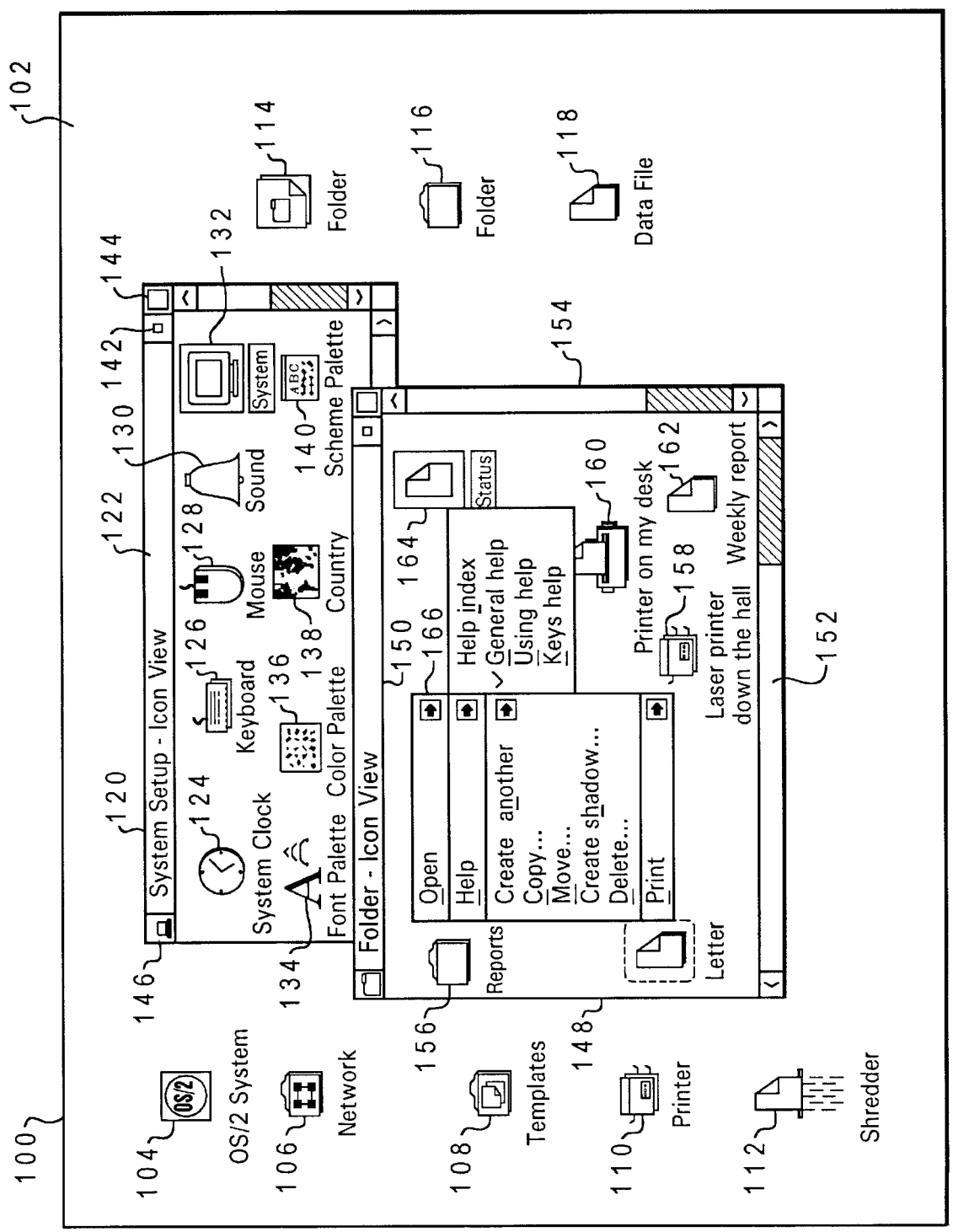
FIG. 5 is a screen representation of the desktop employed in the present invention.

It may be appropriate at this point to briefly review selected features of the OS/2 2.0 GUI. FIG. 5 illustrates a typical display screen 100 which appears when using OS/2 2.0. The viewing area within screen 100 is referred to as desktop 102. Desktop 102 includes a plurality of user selectable icons which are conveniently selected by double clicking the left button of the mouse. Each icon represents an application, function or file storage area which the user can select. For example, as seen in FIG. 5, desktop 102 includes an OS/2 System icon 104, a Network icon 106, a Templates icon 108, a Printer icon 110, a Shredder icon 112, a Folder icon 114, another Folder icon 116 and a Data file 118.

When the user selects an icon by double clicking the same, the corresponding function is activated and the icon becomes highlighted. For example, when the OS/2 System icon 104 is selected on desktop 102, OS/2 System icon 104 becomes highlighted as illustrated in FIG. 5. When OS/2 System icon 102 is so selected, a corresponding window 120 of further possible selections is displayed on desktop 102. More specifically, window 120 includes a title bar 122 in which the name of the selected window is designated in text as "System Setup—Icon View". In this particular example, the selectable icons appearing within System Startup window 120 includes a System Clock icon 124, a Keyboard icon 126, a Mouse icon 128, a Sound icon 130, a System icon 132, a Font Palette icon 134, a Color Palette 136, a Country icon 138 and Scheme Palette 140.

The upper right corner of window 120 includes a small box 142 which, if selected by the user, minimizes window 120, thus dismissing window 120 and returning window 120 to the icon 104 representation thereof. The upper right corner of window 120 also includes a box 144, larger than box 142 and which if selected by the user, maximizes window 120, thus causing window 120 to occupy substantially all of desktop 102.

The icon representation 146 appearing in the upper left corner indicates the type of window to which it corresponds. For example, window 120 is a system setup window; accordingly, the icon appearing in the upper left corner of window 120 is representative of the System icon. Had system clock icon 124 been selected, the icon appearing in the upper left corner of its window would be representative of a clock.

Since title bar 122 of window 120 is depicted in white or "not-highlighted", this indicates the window 120 is not presently selected or active. Rather the user has clicked on and selected Folder 114 as indicated by its highlighted nature. When Folder 114 was so selected, a corresponding Folder window 148 was opened on desktop 102 in overlapping fashion with respect to the earlier opened System Setup window 120. The title bar 150 of window 148 indicates the title of window 148 as being "Folder-Icon View". It is noted that title bar 150 of window 148 is highlighted, thus indicating that window 148 is presently the active window.

Window 148 includes a horizontal scroll bar 152 which can be engaged by the user to scroll through the contents of window 148 from left to right and from right to left all within the particular viewing area defined by the chosen dimensions of window 148. Window 148 also includes a vertical scroll bar for scrolling through the window contents vertically. Other windows generated by the operating system also include this feature. For purposes of example, window 148 includes a Reports icon 156, a Laser Printer Down The Hall icon 158, a Printer On My Desk icon 160, a Weekly Report icon 162 and a Status icon 164.

IV. Resizable Maximized Windows in OS/2 Version 2

Figure 6:
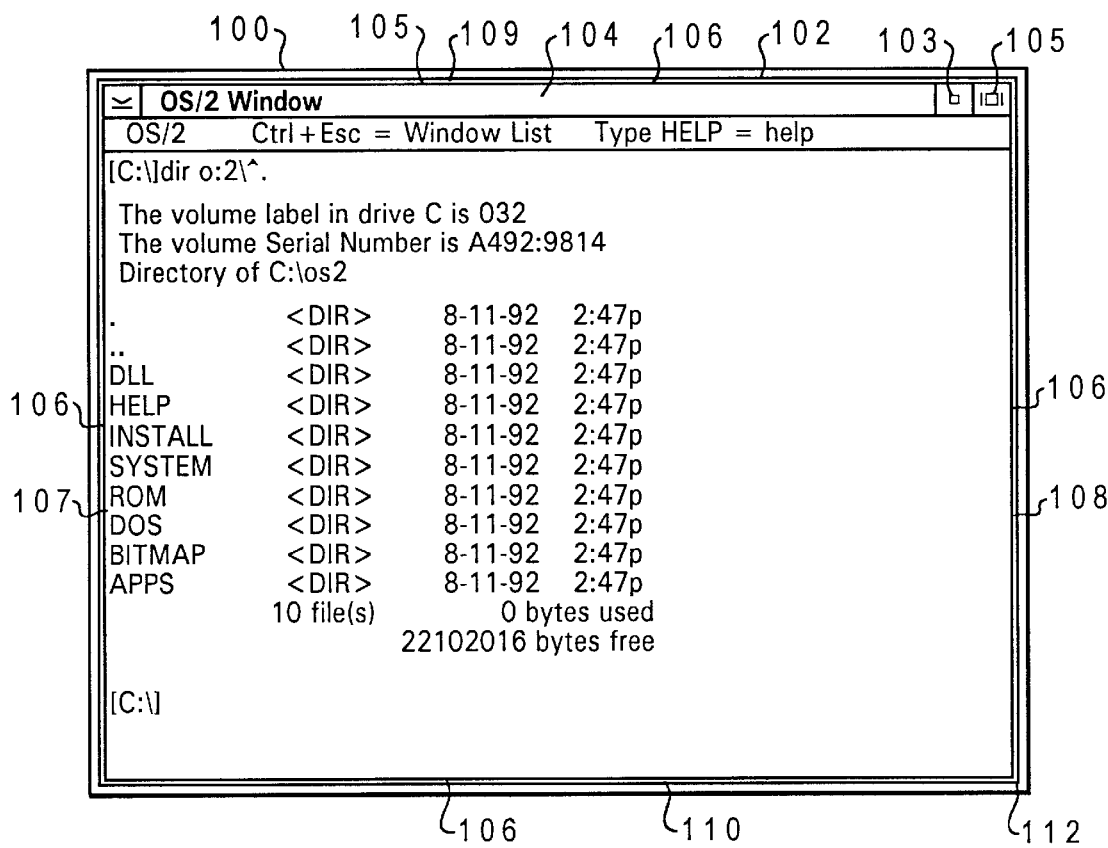
FIG. 6 is a screen representation of a maximized window in the present invention.

FIG. 6 depicts a maximized OS/2 window 104 situated on desktop 102 of screen 100. Window 104 can be minimized by selecting the minimize button 103 in the upper right corner of window 104. Window 104 is maximized by selecting the maximize button 105, also in the upper right corner of window 104 or by selecting a maximize option from a menu. The operating system is capable of generating two types of maximimized windows, a first type wherein the maximized windows occupies substantially all of the viewing area of the screen such in the case of window 104 in FIG. 6 and a second type of window wherein the window, although maximized in size, occupies less than the viewing area of the screen.

Window 104 is four-sided and exhibits a generally rectangular shape. The periphery of window 104 is designated as periphery 106 and consists of the aforementioned four sides. In this particular embodiment of the invention, the four sides of periphery 106 are outfitted with a window periphery border 105 formed by left border 107, right border 108, upper border 109 and lower border 110.

Figure 7:
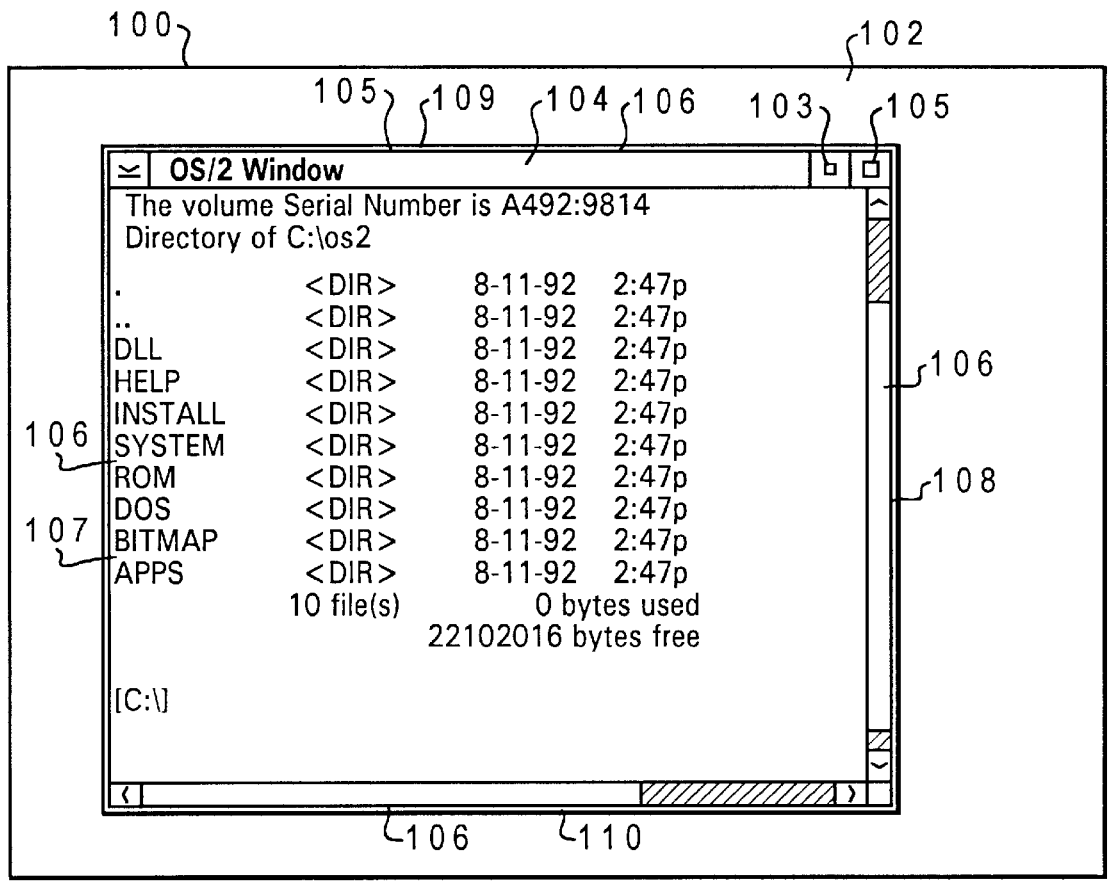
FIG. 7 is a screen representation of a previously maximized window that has been resized in accordance with the present invention.

FIG. 7 shows window 104 after being resized in accordance with the method of the present invention. By using the method of the present inventions the size of the maximized window can be adjusted via direct mouse manipulation or cursor key direct manipulation. In other words, while window 104 is still in the maximized state depicted in FIG. 6, the user uses the mouse or other pointing device to place the pointer on the window periphery border 105 formed by left border 107, right border 108, upper border 109 and lower border 110.

The user then clicks on periphery border 105. This causes a sizing border 111 (indicated by cross hatching in FIG. 8) to be superimposed on periphery border 105. Sizing border 111 initially has the same size and dimensions as periphery border 105 therebelow and includes upper, lower, right and left borders (referred to also as border portions) in a manner analogous to periphery border 105. In one embodiment, sizing border 111 is a gray dithered rectangular box. In actual practice the user clicks on one of the upper, lower, right or left borders of sizing border 111 and drags or moves that sizing border portion in a selected direction. The position of the border portion (right, left, upper or lower border) follows the change in position of the mouse pointer and in this manner the location of the selected border and the size and shape of the window is changed. The size and shape of the sizing border changes, that is, stretches or contracts, in accordance with the changing mouse pointer position.

Conveniently, the position of two borders may be changed simultaneously by clicking on a corner where two borders portions intersect, for example, corner 112 between borders 108 and 110. The corner is then dragged in a selected direction to alter the size and shape of the previously maximized window 104 as desired. It is emphasized that by using this technique, the size and shape of a maximized window is changed directly without the necessity of entering the restored state.

If a situation is encountered wherein a window is maximized to such an extent that the window periphery border is not visible because it is so close to the edges of the computer screen, then the user clicks on the title bar and moves the window to a location wherein the window periphery border becomes visible. The process of resizing the maximized window is then carried out in a manner similar to that described above.

Figure 8:
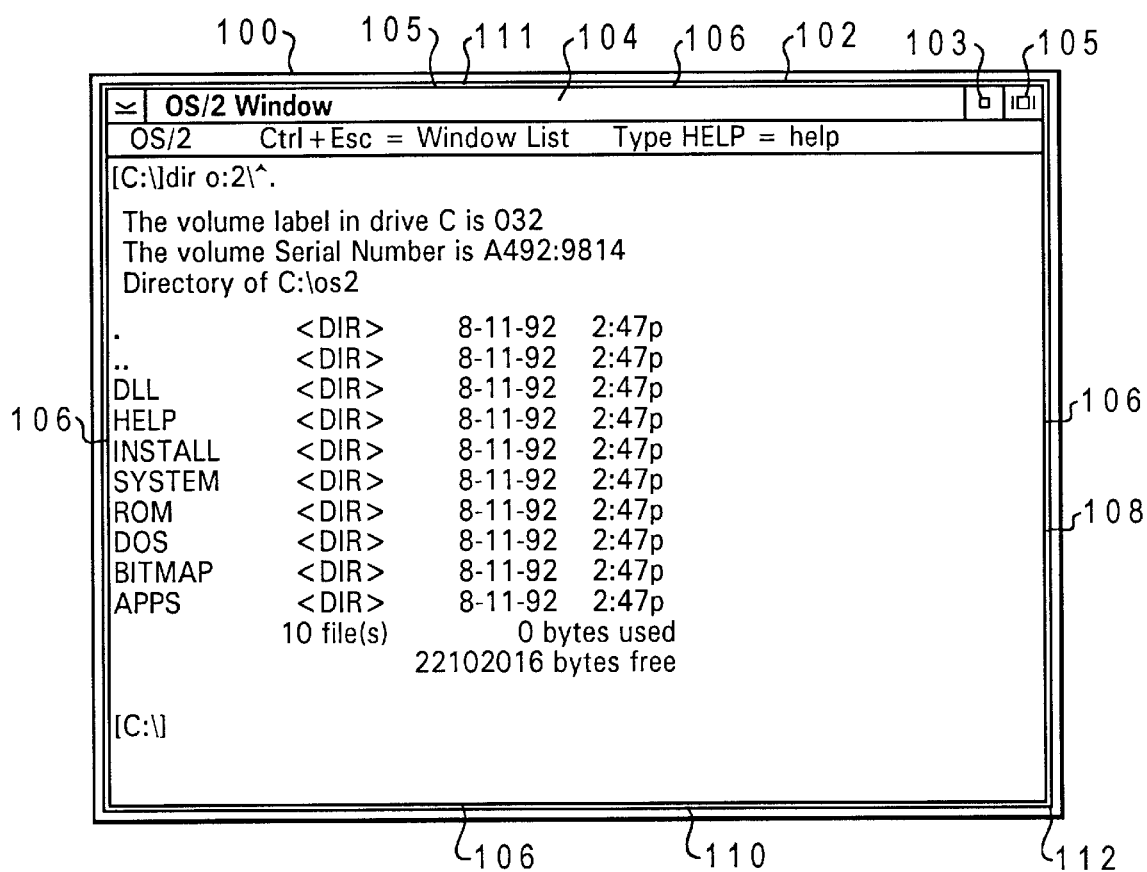
FIG. 8 is a screen representation of a maximized window in which a sizing border has been superimposed over the periphery border of the window.

The flowchart of FIG. 8 outlines in more detail the steps involved in the method of resizing maximized windows provided by the present invention and implemented in computer 10. The method includes maximizing a window as per block 201. When a window is maximized, it will be resized from its present size to its largest supported size or to the dimensions of the display, whichever is smaller. The computer then waits for input as per block 202. All actions on a window are based on a mouse and/or keyboard event. The computer waits for such activity in block 202.

A determination is then made as to whether or not the pointer has moved as per decision block 203. If it is determined in decision block 203 that the pointer has not moved, then flow continues to decision block 210, discussed later. However, if an input event caused a move of the mouse pointer, then process flow continues to decision block 204 at which a determination is made as to whether or not a sizing border of the window is active.

A sizing border becomes active while a window is being sized, an event initiated at block 212, discussed later. If it is found that a window is in the process of being sized, process flow continues to block 207 at which the sizing border position is adjusted. Since a resize operation has been started, every time the mouse pointer moves to a new location, the sizing border is redrawn to extend or collapse to that position. Process flow then returns to the wait for input block 202.

Otherwise, if in block 204 it is found that a window is not in the process of being resized, then process flow continues to block 205 at which a test is conducted to determine if the pointer is over the border. If the pointer is found to be over the border of the window, then process flow continues to block 206. Since the pointer is over a border, the pointer is changed at block 206 to a sizing pointer (a double-headed arrow) to indicate that it is valid to start changing the size of the window. Process flow then returns to the wait for input block 202.

If however, at block 205, it is determined that the mouse pointer is not over a border, then flow continues to block 208 at which a determination is made to see of the previous pointer was over a border. If the last mouse position was over a border of the window, then the pointer is restored as per block 209. In other words, since the current position of the mouse makes it ineligible for a resize operation to begin, the pointer is restored to its default state. Process flow then returns to the wait for input block 202.

Returning now to decision block 203, a decision is made to see if the pointer has moved. If it is determined the pointer did not move, then a test is made at block 210 to see if a mouse button was pressed. If it is determined that the input event was a mouse button being pressed, then flow continues to decision block 211 at which a determination is made to find out if the pointer is over a border. If block 211 finds that the pointer is indeed over a border, then flow continues to block 212 at which a sizing border is drawn to indicate that a resize of the current window is in progress. The sizing border is initially drawn directly over the four borders of the window. Process flow then returns to the wait for input block 202. If, however, it is found in block 211 that the pointer is not over a border, then process flow directly returns to the wait for input block 202.

If block 210 failed to find that a mouse button was pressed, then flow continues to decision block 213 where a determination is made to see if the input event was a mouse button being released. If the input event was indeed a mouse button being released, then flow continues to block 214 at which a determination is made to see if the sizing border is active. If the sizing border is not active then process flow returns back to the wait for input block 202.

However, if the sizing border is found to be active at block 214, then the window size is adjusted at block 215. Now that the resize operation is about to complete, the window is resized to match the four borders of the sizing border rectangle. Since the window has now been resized, the sizing border is removed or dismissed as per block 216 and if the mouse pointer is no longer over a window border, it is restored to its default state at block 217. The resizing operation is then complete.

Returning now to decision block 213, if it was determined that no mouse button was released, then a determination is made a decision block 218 to ascertain if the Esc button was pressed. If the Esc button was not pressed, then flow returns to the wait for input block 202. If, however, the Esc button was pressed then flow continues to decision block 219 at which a determination is made to see if the sizing border is presently active. If the sizing border is not active, then flow returns to the wait for input block 202. If, however, the sizing border is active, then the sizing border is dismissed at block 216 and the pointer is restored at block 217. The resizing operation is then complete.

The foregoing has described a method and apparatus for resizing maximized windows in a graphical user interface in a computer system. The invention reduces the time consumed by the user when attempting to adjust the size of a maximized window on a computer screen in a graphical user interface. Moreover, the invention enhances the ease of use of a graphical user interface. The method and apparatus of the invention desirably eliminates the need to access the restore state of a window previously required to achieve resizing of a maximized window.

While the invention has been illustrated in connection with a preferred embodiment, it should be understood that many variations will occur to those of ordinary skill in the art, and that the scope of the invention is defined only by the claims appended hereto and equivalent.

I claim:

1. A method for displaying a window on a computer screen in a computer system employing a graphical user interface which includes a pointer, said method comprising the steps of:

displaying on said computer screen a window including a periphery and a border being situated around said periphery;

maximizing said window to occupy substantially all of said computer screen;

locating said pointer on said border;

activating said pointer, and moving said pointer to a desired location on said computer screen, said window changing in dimension in correspondence to said moving of said pointer on said computer screen.

2. The method of claim 1 wherein said border completely surrounds the periphery of said window.

3. The method of claim 1 wherein said window is rectangular.

4. A method for displaying on a computer screen in a computer system employing a graphical user interface which includes a pointer, said method comprising the steps of:

displaying on said computer screen a window including a periphery and a periphery border being situated around said periphery said window being maximized;

locating said pointer on said periphery border;

activating said pointer;

superimposing a sizing border on said periphery border;

moving said pointer to a desired location on said computer screen, said sizing border changing in dimension in correspondence to said moving of said pointer on said computer screen; and the periphery border assuming said dimension of said sizing border when said pointer is inactivated.

5. The method of claim 4 wherein said periphey border completely surrounds the periphery of said window.

6. The method of claim 4 wherein said window is rectangular.

7. A method for displaying a window on a computer display screen in a computer system employing a graphical user interface which includes a pointer and a pointing device, said method comprising the steps of:

displaying on said computer screen a window including a periphery and a first border being situated around said periphery;

maximizing said window to occupy substantially all of said computer screen;

locating said pointer on said first border by moving said pointer with said pointing device;

selecting said first border with said pointing device to create a sizing border initially superimposed on said first border and having dimensions substantially equal thereto;

dragging a portion of said sizing border from a first location on said computer screen to a second location on said computer screen to change said dimensions of said sizing border;

deselecting said sizing border with said pointing device, and changing said first border to match said dimensions of the sizing border.

8. The method of claim 7 wherein said first border completely surrounds the periphery of said window.

9. The method of claim 7 wherein said window is rectangular.

10. A data processing system for displaying a window on a computer screen in said data processing system, said data processing system having a graphical user interface which includes a pointer, said data processing system comprising:

means for displaying on said computer screen a window including a periphery and a border being situated around said periphery;

means for maximizing said window to occupy substantially all of said computer screen;

means for locating said pointer on said border;

means for activating said pointer;

means for moving said pointer to a desired location on said computer screen; and means for changing said window in dimension in correspondence to said moving of said pointer on said screen.

* * * * *

UNITED STATES PATENT AND TRADEMARK OFFICE
CERTIFICATE OF CORRECTION

PATENT NO. : 6,141,008
DATED : October 31, 2000
INVENTOR(S) : Marc Alan Bloomfield It is certified that error appears in the above-identified patent and that said Letters Patent is hereby corrected as shown below:

Abstract,
Delete the Abstract and replace with:

-- A method of operating a computer system including a graphical user interface (GUI) is provided. The improved graphical user interface permits the user to resize a maximized window without first changing the maximized window to the restored state. In this manner, the GUI user's valuable time is conserved and productivity is enhanced. To implement this method, a maximized window is first displayed on the computer screen. The window includes a periphery with a border situated around such periphery. The pointer is located on the border and is then activated. The user then moves the pointer to a desired location on the screen. The dimensional size of the window changes is correspondence to the motion of the pointer on the screen, thus causing the window to be resized.

Signed and Sealed this

Sixth Day of November, 2001

*Attest:*

NICHOLAS P. GODICI
*Attesting Officer*    *Acting Director of the United States Patent and Trademark Office*